June 14, 1960
F. A. SAAL
2,941,039
TRAFFIC SIMULATION
Filed July 11, 1958
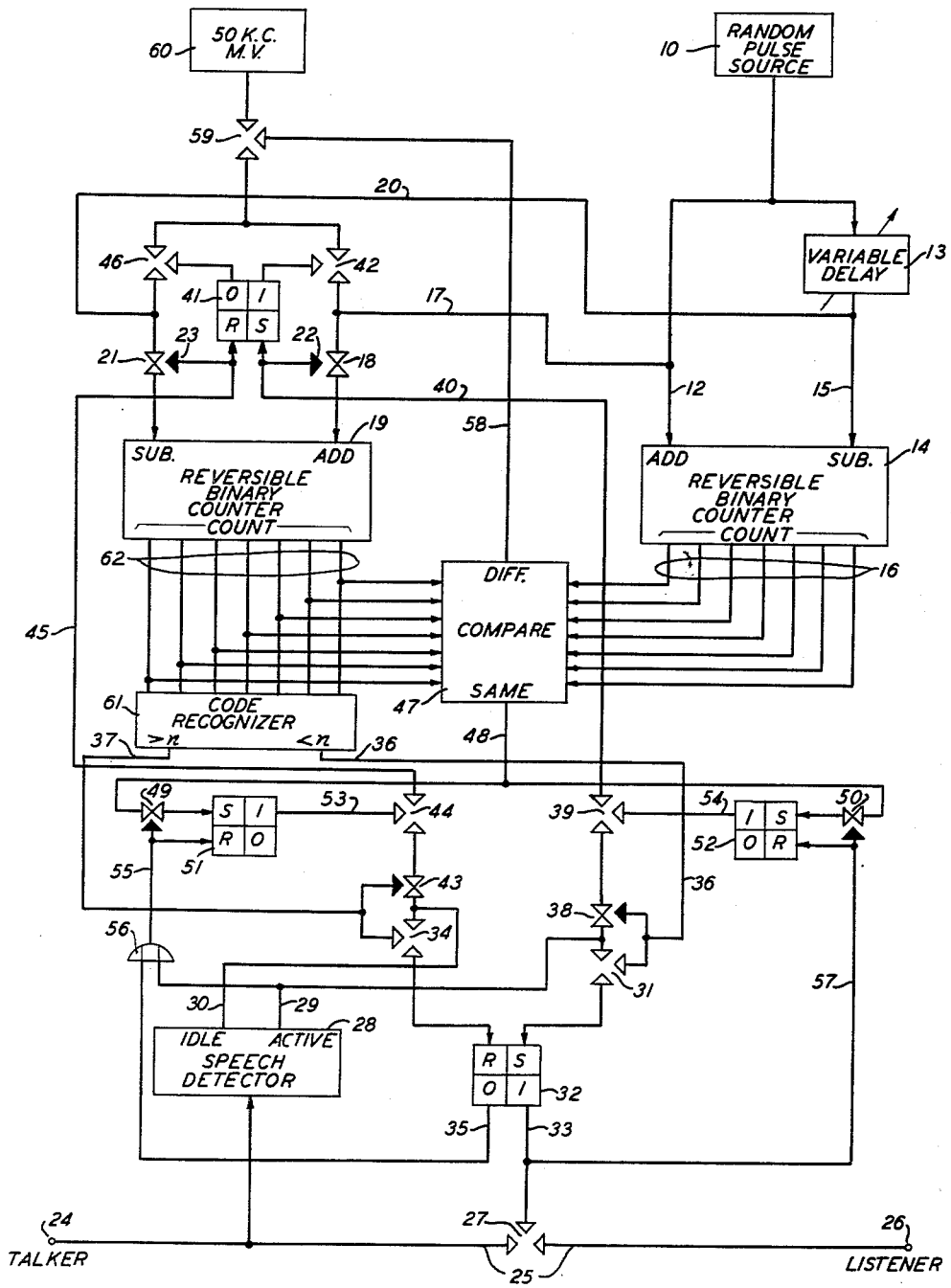
INVENTOR
F. A. SAAL
BY
L.O. Hinz
ATTORNEY United States Patent Office 2,941,039
Patented June 14, 1960

2,941,039

TRAFFIC SIMULATION

Frederick A. Saal, Plainfield, N.J., assignor to Bell Telephone Laboratories, Incorporated, New York, N.Y., a corporation of New York Filed July 11, 1958, Ser. No. 747,977

15 Claims. (Cl. 179—15)

This invention relates to traffic simulation and, more particularly, to the simulation of statistical processes with respect to communications systems.

Many communications systems depend in part for their proper operation on the statistical properties of human speech. A Time Assignment Speech Interpolation (TASI) System, for example, utilizes these statistical properties to increase the efficiency of expensive transmission facilities. As disclosed in the copending application of the present applicant and I. Welber Serial No. 686,468, filed September 26, 1957, a TASI system is based on the statistical fact that any single speaker utilizes the transmission facilities, on the average, for less than one-third of the time. The remainder of the time is taken up in listening to the other party, pausing while thinking of what to say, and pauses between vocal intervals. The TASI system uses these "idle" periods for transmitting the speech of other parties on the transmission facilities. In this way, a given number of transmitting channels can be made to serve a far larger number of talker lines.

In order to take advantage of the idle periods in speech, the duration of each "talkspurt," i.e., the interval during which a talker continuously emits speech, must be determined. For a large number of talkers, the occurrence and duration of "talkspurts" are very nearly random. The operation of a TASI system is therefore determined to a large extent by the statistical properties of these randomly occurring "talkspurts."

It is an object of the present invention to simulate the important statistical properties of random events such as the talkspurts in human speech.

It is another object of the invention to utilize the statistical properties of simulated random events to test the capabilities and limitations of signal transmission systems.

It is a more specific object of the present invention to simulate a statistically determined transmission system, such as a time assignment speech interpolation system, with respect to its effect on a single transmission path.

In accordance with one embodiment of the present invention, these and other objects are achieved by utilizing an electronic "throwdown" circuit, i.e., a circuit which keeps a running account of the arrival times and departure times of random conditions, to simulate the statistical properties of a time assignment speech interpolation system and then to control the transmission characteristics of a single voice path. More specifically, means are provided to simulate the operations of a TASI system in response to randomly occurring events, that is, to simulate the activities of a large number of talkers and their effect on the system, but only insofar as these activities affect the transmission path under test.

In a preferred embodiment of the present invention, the throwdown circuit comprises a reversible binary counter the count of which is increased in response to the simulated random arrival times of conditions such as talkspurts and is reduced in response to the simulated departure times of these conditions. The count of this counter therefore represents the number of events which are occurring simultaneously at every instant.

In any transmission system, such as a TASI system, where there are more talker lines than transmission channels, it is possible that at some time more talkers will simultaneously require transmission facilities than there are channels available. In the event that such is the case, one or more of the talkers is denied access to the transmission facilities and his talkspurt is clipped or entirely lost. The amount of such clipping, commonly called "freeze-out," which can be subjectively tolerated, determines the design constants of the system. It is extremely difficult, if not impossible, to estimate this subjective effect beforehand since it involves a large number of random factors.

In accordance with the present invention, these design constants can be determined experimentally, without the necessity of building an entire system, by utilizing the output of a throwdown circuit such as that described above, which output simulates the behavior of a large number of talkers, to control the availability of a transmission path to a single test talker. The output of this transmission line provides a convenient measure of the subjective effect of "freeze-outs" while the throwdown circuit provides a measure of the constants of an associated system.

It will be noted that the throwdown circuit described above does not keep an accurate history of any of the individual random conditions. Instead, it registers the operation of the system as a whole. The advantage of this arrangement lies in the fact that the system operation can be simulated with extreme speed, allowing tests to be carried on in "real time." This advantage is important when it is necessary to evaluate the subjective effect of the system operation, as contemplated by the present invention.

These and other objects and features, the nature of the present invention and its various advantages, will appear more fully upon consideration of the attached drawing and the following detailed description of the drawing.

The single figure of the drawing is a schematic block diagram of a system simulator for a time assignment speech interpolation system in accordance with the present invention. For purposes of illustration, the simulator shown in the figure has been arranged to simulate the TASI system described in the above-mentioned application of which the present applicant is a co-inventor. It is to be understood, however, that the principles taught herein may be easily applied to any other TASI system or to any communications system depending on the statistical properties of random events.

Referring more particularly to the figure, there is shown a random pulse source 10 which may comprise any known random signal generator such as, for example, a radioactive source and a radiation counter, a gas diode, or any other random signal generator. Preferably, source 10 provides output pulses with approximately a binomial probability distribution with time and with a variable repetition rate. Such variation in average repetition rate may be obtained in any manner known in the art. For example, a variable threshold device to which a noise signal is applied, such as is shown in the copending application of B. A. McLeod, Serial No. 714,392, filed February 10, 1958, would be suitable. As will be seen later, source 10 controls the activity or mean rate of occurrence of the random events being simulated by the apparatus of the present invention.

The output of source 10 is simultaneously connected to an add lead 12 and a variable delay circuit 13. Pulses on add lead 12 serve to increase the count in a reversible binary counter 14. The output of delay circuit 13 is applied to a subtract lead 15; pulses on this lead serve to reduce the count in binary counter 14. Reversible counter 14 may have any form known in the art such as, for example, that disclosed in R. L. Trent Patent 2,665,845, issued January 12, 1954.

Each pulse leaving source 10 increases the count in counter 14 by one unit and, at a fixed time later, as determined by delay circuit 13, reduces the count of counter 14 by one unit. The pulses arriving on add lead 12 can therefore be used to represent the arrival times of random conditions while the pulses on subtract lead 15 can be used to represent the departure times of these same random conditions. It will be noted, however, that for any setting of delay circuit 13, the holdover time of all of these random conditions is constant. Apart from this restriction, the count output of counter 14 appearing on leads 16 provides an accurate instant by instant representation of the total number of simulated random events which are occurring simultaneously. The rate of occurrence of these random events can be varied by controlling the average pulse repetition rate of source 10.

In the specific embodiment of the present invention illustrated in the figure, the random conditions which are being simulated are the talkspurts occurring in human speech. The hold-over time of these talkspurts, that is, the talkspurt lengths, are, of course, not actually constant. It can be shown, however, that the restriction to constant talkspurt lengths does not introduce substantial errors in the simulation of a TASI system.

The add pulses on lead 12 are also introduced by way of lead 17 and normally-closed gate 18 to the add input of a second reversible binary counter 19. Similarly, the subtract pulses on lead 15 are introduced by way of lead 20 and normally-closed gate 21 to the subtract input of reversible binary counter 19. Means, indicated schematically by arrowheads 22 and 23, are provided to disable normally-closed gates 18 and 21, respectively. As long as gates 18 and 21 remain closed, however, the counts stored in binary counters 14 and 19 will remain identical. As described above, counter 14 operates as a register to indicate the number of simulated talkspurts in progress at any instant. Counter 19, on the other hand, together with logic circuitry to be described later, operates as a convenient means to "queue" the simulated talkspurts and a test talker.

Turning to the lower portion of the figure, an input terminal 24 is provided to connect a test talker to one end of a voice transmission line 25. Terminal 26 is provided to connect a test listener to the other end of transmission line 25. Included in transmission line 25 is a normally-open gate 27. Connected to the talker side of gate 27 is a speech detector 28. Speech detector 28 may be of any known configuration which provides on two output leads 29 and 30 an indication of whether or not the test talker connected to terminal 24 is actively emitting speech. Thus, a signal of a first kind, for example, a positive voltage, is provided on active lead 29 when the test talker is actively engaged in talking. At all other times a signal of a different kind, for example, zero voltage, appears on active lead 29. Conversely, when the test talker is not actively engaged in a talkspurt, a signal of the first kind appears on idle lead 30, and when the test talker is engaged in a talkspurt, a signal of the different kind is provided on lead 30. Speech detector 28 therefore serves as a monitor of the test transmission line 25, giving a positive indication, on lead 29 or 30, of the activity or inactivtiy of the test talker at each instant.

Active lead 29 of speech detector 28 is connected by way of normally-open gate 31 to the set input of a bistable device 32. When gate 31 is enabled, an active indication on lead 29 serves to set bistable device 32 and to provide an output on lead 33. Idle lead 30 is connected by way of normally-open gate 34 to the reset input of bistable device 32. When gate 34 is enabled, an idle indication on lead 30 serves to reset bistable device 32 and to provide an output on lead 35.

Gates 31 and 34 are enabled by two outputs of code recognizer 61 appearing on leads 36 and 37, respectively. Code recognizer 61 is connected to the coded output leads 62 of binary counter 19. An output on lead 36 of code recognizer 61 is indicative of the fact that the count output of counter 19 is less than a predetermined number $n$, while an output on lead 37 of code recognizer 61 indicates that the count output of counter 19 is equal to or greater than the number $n$. Such code recognizers are well known in the art and may comprise, for example, a simple diode logic circuit which distinguishes the number $n$ and all numbers greater than $n$ from the numbers which are less than $n$.

From the arrangement shown, it can be seen that an active indication on lead 29 serves to set bistable device 32, enable gate 27 and connect the test talker to the test listener by way of transmission line 25. This is allowed to occur, however, only if gate 31 is enabled, i.e., the count in counter 19 is less than $n$. If it is assumed that $n$ represents the number of transmission channels available to the talkers simulated by random pulse source 10, then the operation of these elements serves to freeze the test talker out, that is, deny him access to transmission line 25, whenever all of the $n$ transmission channels are already "occupied" by the simulated talkspurts.

Similarly, an idle indication on lead 30 serves to reset bistable device 32, disable gate 27 and disconnect the test talker from the test listener. This is allowed to occur, however, only if gate 34 is enabled, i.e., the count in counter 19 is equal to or greater than $n$, the number of transmission channels available. The operation of these elements serves to maintain the test talker's connection to the test listener even after he has ceased speaking so long as all of the available channels are not "occupied" by the simulated talkspurts.

The two functions described above are characteristics of the TASI system described in the aforementioned co-pending application. That is, a talker is allowed to retain his transmission channel even after he has stopped talking, provided it is not required by someone else. Once someone else seizes his channel, however, he does not regain a channel until one becomes available. These characteristics are built into the simulator of the present invention only for purposes of illustration. It is apparent that the characteristics of any TASI system, or of any switching system subject to random traffic, can be similarly incorporated.

Returning to the figure, the active output lead 29 of speech detector 28 is also connected by way of normally-closed gate 38, normally-open gate 39 and lead 40 to the set input of a bistable device 41. A signal on lead 40 serves to disable normally-closed gate 18 by way of the control lead terminated schematically in arrowhead 22 and to set bistable device 41, thus to provide an output which enables normally-open gate 42.

The idle output lead 30 of speech detector 28 is similarly connected by way of normally-closed gate 43, normally-opened gate 44 and lead 45 to the reset input of bistable device 41. A signal on lead 45 serves to disable normally-closed gate 21 by way of the control lead terminated schematically in arrowhead 23 and serves to reset bistable device 41 to provide an output which enables normally-open gate 46.

Ignoring for the moment gates 39 and 44, it can be seen that signals on leads 40 and 45 perform a function for the simulated talkers similar to that performed by speech detector 28, gates 31 and 34 and bistable device 32 perform for the test talker. A signal on active lead 29 of speech detector 28 serves to disable normally-closed gate 18 and block the application of pulses from random pulse source 10 to the add input of counter 19. This corresponds to the prevention of any more simulated talkers from seizing transmission channels. These simulated talkers are blocked only if gate 38 is not disabled, i.e., the count in counter 19 is greater than $n$, the number of transmission channels available. Thus a signal on lead 40 prevents any more of the simulated talkers from freezing out the test talker once the test talker has initiated a talkspurt and been denied access. In this way, counter 19 forms a "connection queue," the test talker being placed at the bottom of this queue. When a sufficient number of simulated talkers terminate their talkspurts by way of the subtract input to counter 19, the count becomes less than $n$ and gate 38 is disabled. Gate 18 therefore becomes re-enabled and the simulated talkers are no longer blocked.

Reversible counter 19 also serves as a disconnection queue in the following manner. Ignoring for the moment gate 44, an idle input on output lead 30 of speech detector 28 serves to disable normally-closed gate 21 by way of gate 43 and lead 45. The disablement of gate 21 prevents the application of pulses from delay circuit 13 to the subtract input of counter 19. This corresponds to allowing the simulated talkers to retain their transmission channels even after they have terminated their talkspurts. This takes place, however, only if the count is less than $n$. When the count becomes greater than $n$, an output on lead 37 disables gate 43 and prevents the disablement of the subtract input to counter 19. Thus a signal on lead 45 serves to fill all of the available transmission channels as quickly as they are required by the simulated talkspurts. When they are all full, a signal on lead 37 serves to inhibit this action. It should be noted that a signal on lead 37 also enables normally-open gate 34 to allow the idle indication to reset bistable device 32 and disconnect the test talker from the test listener. This corresponds to taking the channel assigned to the test talker away from him when ($a$) he is not actually using it and ($b$) when it is needed by one of the simulated talkers.

From the above description, it will be noted that reversible counter 19 serves to maintain the test talker in a proper relationship to the simulated talkers. To this end, a running account of the number of simultaneously active simulated talkers is maintained in counter 19. When the test talker does not require a channel, as indicated by an idle output on lead 30, the simulated talkers are allowed to retain their "assignments" after the end of their talkspurts by not being subtracted from the count in counter 19. When the number of simulated talkers which have been thus "assigned" equals the number of available channels ($n$), they are again subtracted from the count.

When all of the available channels have been thus "assigned" and the test talker desires a connection, as indicated by an active signal on output lead 29 of speech detector 28, he is not given a connection until the count has come down below $n$, i.e., a channel becomes available. In order to give the test talker the preference due to the time of initiation of his talkspurt, all simulated talkspurts which are initiated at a later time are denied access to counter 19. As soon as the count in counter 19 is reduced to one less than $n$, indicating that a channel is now available, the test talker's connection is made by way of gate 31, bistable device 32 and gate 27. The length of time for which the test talker must wait for this connection is termed the "freeze-out" and depends on the random characteristics of the simulated speech.

It will be noted that upon the completion of a connection or disconnection queuing process by counter 19, the count therein will no longer match the count of counter 14. In order to preserve the accuracy of the simulation process, these two counts must be brought back into step. The circuit arrangements for accomplishing this result will be described hereafter.

A compare circuit 47 is provided to make a digit by digit comparison between the output of binary counter 14 and the output of binary counter 19. When these outputs are identical, a signal is produced on lead 48 which serves to set, by way of normally-closed gates 49 and 50, bistable devices 51 and 52, respectively. When bistable device 51 is set, an output is produced on lead 53 which serves to enable normally-open gate 44. Similarly, when bistable device 52 is set, it produces an output on lead 54 which serves to enable normally-open gate 39. Gates 39 and 44 operate to prevent connection and disconnection queuing until the count of counters 14 and 19 have been returned to synchronism after a previous queuing operation. This is done by not enabling normally-open gates 39 and 44 until bistable devices 52 and 51 are in a set condition, indicating that the counts are the same.

Bistable device 51 is reset and the output removed from lead 53 by means of a signal on lead 55. Lead 55 carries the output of an OR gate 56, one input of which is derived from output lead 35 of bistable device 32 and the other input of which is derived from active lead 29 of speech detector 28. A signal on lead 55 also serves to disable normally-closed gate 49. Bistable device 51 is therefore maintained in a reset condition whenever the test talker is disconnected from the test listener, as indicated by an output on lead 35 from bistable device 32, or whenever the test talker is active, as indicated by an output on active lead 29 of speech detector 28. This arrangement insures that disconnection queuing takes place only when the test talker is idle and connected to the test listener, and thus is not actively holding his channel. Furthermore, due to the bistable nature of device 32, disconnection queuing is prevented even after the talker again becomes active until the counts in counters 14 and 19 become identical.

Bistable device 52 is reset and the output removed from lead 54 by a signal on lead 57 which is derived from the output lead 33 of bistable device 32. A signal on lead 57 also serves to disable normally-closed gate 50. Thus, whenever the test talker is already connected to the test listener, the connection queuing operation is inhibited. This condition, indicated by an output of bistable device 32 on lead 33, serves to reset bistable device 52, disable normally-closed gate 50, and maintain gate 39 in an open position. When the talker becomes disconnected through a disconnect queuing operation, bistable device 52 continues to inhibit connection queuing until the counts in counters 14 and 19 become identical.

Returning to compare circuit 47, when the outputs of counters 14 and 19 are not identical, a signal is produced on lead 58 which serves to enable normally-open gate 59 and connect a multivibrator 60 to gates 42 and 46. Multivibrator 60 is of the "free-running" variety and operates as a 50 kilocycle clock pulse source. The clock pulse output of multivibrator 60 is used to bring the count in counter 19 back into step with counter 14 after a queuing operation. After connection queuing, for example, bistable device 41 is in a set condition due to the signal previously existing on lead 40. Normally-open gate 42 is therefore enabled and the clock pulses from multivibrator 60 are applied to the add input of counter 19 to raise the count therein until it matches that of counter 14. At this time, the signal is removed from lead 58 and gate 59 becomes disabled to prevent the further application of clock pulses.

Similarly, after a disconnection queuing operation, bistable device 41 is in a reset condition due to the signal previously existing on lead 45. Normally-open gate 46 is therefore enabled and the clock pulses from multivibrator 60 are applied to the subtract input of counter 19 to lower the count therein until it matches that of counter 14. At this time, the signal is removed from lead 58 and gate 59 becomes disabled to prevent the further application of clock pulses.

The clock pulse source is shown as a 50 kilocycle multivibrator 60 only for the purposes of illustration. Any other pulse source would serve equally well provided only that the pulse rate is sufficiently high to bring the counts back into step within a reasonable time.

It is apparent that the simulator illustrated in the figure has the following characteristics:

(1) The test talker retains the use of the test transmission path 25 for at least the duration of the current talkspurt once that path has been seized.

(2) When the test talker is inactive, he is allowed to retain the use of the test transmission path 25 only until a sufficient number of simulated talker initiate "talkspurts" which "fill up" all of the available "transmission channels." Then the test talker is disconnected.

(3) The test talker may regain the use of the transmission path 25 any time he initiates a talkspurt, provided only that the number of simulated talkers which are simultaneously active is less than the number of available "transmission channels."

(4) If the number of simulated talkers does equal or exceed the number of "transmission channels" ($n$), the test talker obtains service in a "first-come, first-serve" basis and does not regain the use of transmission path 25 until a sufficient number of simulated talkers terminate their "talkspurts" to reduce this number below $n$. The time between the initiation of a talkspurt by the test talker and the actual connection to the listener is termed the "freeze-out."

It is apparent that, insofar as the test talker is concerned, the arrangements of the figure exactly simulate the operations of a time assignment speech interpolation system such as that disclosed in the above-mentioned copending application in which the present applicant is a co-inventor. It is to be understood, however, that with very minor changes well within the skill of one versed in the art, the arrangements of the figure would be equally suitable for any other type of TASI system. Thus, it is apparent that if no queuing is to be provided in the TASI system to be simulated, counter 19 is unnecessary and the count in counter 14 can be used to control the access of the test talker to transmission path 25. Other modifications will be immediately apparent to those skilled in the art.

It will be noted that the simulator of the present invention is also capable of simulating the operation of many other systems besides a TASI system. Any system which utilizes common equipment to serve a large number of randomly occurring events can be simulated with equal facility. A telephone central office, for example, which utilizes a limited number of specific equipments such as dial tone markers, switching networks, or the like, to serve a far larger number of subscribers, encounters the same type of traffic problems. In this case, the source 10 of random pulses would be adjusted to simulate the activity of the appropriate events and the number $n$ would represent the number of available common equipments. Instead of a test talker, a test dialing source or substation would be competing for access to the common equipment.

The greatest advantage of the arrangements of the invention, however, are in systems, like a TASI system, which deal directly with human speech. In this case, a test listener connected to terminal 26 of transmission path 25 can actually hear the speech which has been operated upon by the simulator and hence, in effect, by the simulated system. This provides an extremely convenient measure of the subjective effect of such a system which would not otherwise be available. This subjective evaluation can be simultaneously correlated with the constants of the system being simulated as given by the number $n$ and the settings of pulse source 10 and delay circuit 13. In this way, the optimum design parameters of a system can be obtained with great rapidity and with confidence that the result will be subjectively tolerable.

It is to be understood that the above-described arrangements are merely illustrative of the many specific embodiments which can represent applications of the principles of the invention. Numerous and varied other arrangements can readily be devised by those skilled in the art without departing from the spirit or the scope of the invention.

What is claimed is:

1. In combination, a source of random pulses, first reversible binary counting means, means for applying the output of said source to said first counting means to increase the count therein, means for delaying said pulses, means for applying the output of said delaying means to said first counting means to reduce the count therein, second reversible binary counting means, means for maintaining equality of the counts in said first and second counting means, test subscriber apparatus, signal translation means, means for connecting said test subscriber apparatus to said signal translation means when and only when the count in said second counting means is less than a preselected number, and means responsive to the activity of said test subscriber for disabling said equality maintaining means until said last-named count is less than said preselected number.

2. In combination, first and second sources of random pulses, means for adding pulses from said first source to form a sum, means for subtracting pulses from said second source from said sum to form a net difference, a test signal source, means for detecting the activity of said signal source, signal transmission means, means responsive to said detecting means for connecting said signal source to said transmission means when said source is active, and means responsive to said net difference for disabling said connecting means when and only when said net difference exceeds a preselected value.

3. The combination according to claim 2 further including means responsive to said detecting means for disabling said adding means when said signal source becomes active.

4. The combination according to claim 2 further including means responsive to said detecting means for disabling said subtracting means when said signal source becomes inactive.

5. Signal interpolation system simulating means which comprises a first source of random pulses marking the arrival times of simulated random conditions, a second source of random pulses marking the departure times of said simulated random conditions, counting means responsive to said first and second pulse sources for continuously determining the number of simultaneous random conditions, a source of signals, signal translation apparatus, normally disabled means for connecting said signal source to said translation apparatus, means responsive to the output of said signal source for enabling said normally disabled connecting means, and means responsive to said counting means for disabling the operation of said enabling means when and only when said number exceeds a preselected value.

6. Signal interpolation system simulating means according to claim 5 further including means responsive to said output of said signal source for partially inhibiting the operation of said counting means until said number reaches said preselected value.

7. Signal interpolation system simulating means according to claim 5 in which said second source of random pulses comprises variable delay means and means for applying the output of said first source of random pulses to said delay means.

8. Signal interpolation system simulating means according to claim 6 in which said partially inhibiting means comprises means responsive to the presence of said output for making said counting means unresponsive to said first source of random pulses until said preselected number is reached.

9. Signal interpolation system simulating means according to claim 6 in which said partially inhibiting means comprises means responsive to the absence of said output for making said counting means unresponsive to said second source of random pulses until said preselected number is reached.

10. Means for simulating the operation of a time assignment signal interpolation system which comprises a source of random pulses, means for varying the average repetition rate of the output of said random pulse source, first reversible binary counting means, means for applying said output to said first counting means to increase the count therein, means for delaying said output, means for applying said delayed output to said first counting means to reduce the count therein, second reversible binary counting means, first normally enabled means for connecting said output to said second counting means to increase the count therein, second normally enabled means for connecting said delayed output to said second counting means to reduce the count therein, a source of signals, a normally disabled transmission channel, means for detecting the activity status of said signal source, and means responsive to an active status of said signal source for enabling said normally disabled transmission channel when and only when said count in said second counting means is less than a preselected number.

11. Apparatus according to claim 10 further including means also responsive to an active status of said signal source for disabling said first normally enabled connecting means when and only when said count in said second counting means is at least as great as said preselected number.

12. Apparatus according to claim 10 further including means responsive to an inactive status of said signal source for disabling said second normally enabled connecting means when and only when said count in said second counting means is less than said preselected number.

13. Apparatus according to claim 10 further including means for comparing the counts in said first and second counting means, and means responsive to said comparing means for bringing said counts into synchronism.

14. In a system for simulating random traffic conditions, a source of random pulses, counting means for registering the instantaneous density of the output of said pulse source at each instant, a test subject, utilization means, said test subject being one member of a class of subjects all members of which are adapted to use said utilization means for random intervals, detecting means for determining said random intervals for said test subject, means responsive to said detecting means for providing access for said test subject to said utilization means during said random intervals, and means, responsive to said counting means, for disabling said access providing means when said output density exceeds a preselected threshold level.

15. Apparatus according to claim 14 further including means responsive to said detecting means for preventing said counting means from registering any further increases in said output density after the initiation of the ones of said random intervals begun during the operation of said disabling means.

References Cited in the file of this patent

UNITED STATES PATENTS

| | | |
|---|---|---|
| 2,490,833 | Ransom | Dec. 13, 1949 |
| 2,541,932 | Melhose | Feb. 13, 1951 |
| 2,577,141 | Mauchly et al. | Dec. 4, 1951 |
| 2,619,548 | Lesti | Nov. 25, 1952 |
| 2,727,094 | Flowers et al. | Dec. 13, 1955 |
| 2,860,323 | Burkhart et al. | Nov. 11, 1958 |

FOREIGN PATENTS

| | | |
|---|---|---|
| 781,622 | Great Britain | Aug. 21, 1957 |